(12) United States Patent
Tsai et al.

(10) Patent No.: US 9,408,122 B2
(45) Date of Patent: Aug. 2, 2016

(54) OBTAINING SYSTEM FRAME NUMBER OF TARGET CELL DURING HANDOVER

(75) Inventors: Chiou-Wei Tsai, Yunlin County (TW); Chia-Chun Hsu, Taipei (TW); Yi-Chun Wei, Hsinchu (TW); Chien-Hwa Hwang, Zhubei (TW)

(73) Assignee: MEDIATEK, INC., Hsin-Chu (TW)

( * ) Notice: Subject to any disclaimer, the term of this patent is extended or adjusted under 35 U.S.C. 154(b) by 134 days.

(21) Appl. No.: 13/347,016

(22) Filed: Jan. 10, 2012

(65) Prior Publication Data

US 2012/0177006 A1 Jul. 12, 2012

Related U.S. Application Data

(60) Provisional application No. 61/431,452, filed on Jan. 11, 2011.

(51) Int. Cl.
*H04W 36/24* (2009.01)
*H04W 36/08* (2009.01)
*H04W 74/08* (2009.01)

(52) U.S. Cl.
CPC .......... *H04W 36/08* (2013.01); *H04W 74/0833* (2013.01)

(58) Field of Classification Search
CPC ..... H04L 1/0025; H04B 7/212; H04W 80/04; H04W 72/04; H04W 72/0446
USPC .......................... 370/314, 321, 331, 329, 330
See application file for complete search history.

(56) References Cited

U.S. PATENT DOCUMENTS

| 2005/0197128 | A1 | 9/2005 | Yang ............................. 455/447 |
| 2008/0058017 | A1* | 3/2008 | Carter et al. .................. 455/561 |
| 2009/0238141 | A1 | 9/2009 | Damnjanovic et al. ........ 370/331 |

(Continued)

FOREIGN PATENT DOCUMENTS

| CN | 101651877 A | 2/2010 |
| EP | 2160048 A1 | 3/2010 |

(Continued)

OTHER PUBLICATIONS

Search Report for the EP patent application 12734379.6 dated Dec. 10, 2015 (10 pages).

(Continued)

*Primary Examiner* — Mang Yeung
*Assistant Examiner* — Natali N Pascual Peguero
(74) *Attorney, Agent, or Firm* — Imperium Patent Works; Zheng Jin

(57) ABSTRACT

A method of obtaining system frame number for handover is provided. A UE receives a handover command from a serving base station in a serving cell. The UE performs downlink synchronization with a target base station. Upon synchronization, the UE determines a radio frame boundary of a target cell. The UE then obtains a system frame number of the target cell based on the radio frame boundary. The UE performs a handover procedure with the target cell by transmitting a RACH preamble to the target base station. The RACH preamble is transmitted over a PRACH resource determined from the system frame number without reading SFN information from a PBCH/BCH broadcasted from the target base station. Finally, the UE establishes data connection with the target base station. Handover interruption time is reduced by obtaining SFN before PBCH reading and decoding.

18 Claims, 6 Drawing Sheets

(56) References Cited

U.S. PATENT DOCUMENTS

| | | | |
|---|---|---|---|
| 2009/0239539 A1 | 9/2009 | Zhang et al. | 455/436 |
| 2010/0022250 A1 | 1/2010 | Petrovic et al. | 455/450 |
| 2010/0178920 A1* | 7/2010 | Kitazoe et al. | 455/436 |
| 2010/0254351 A1 | 10/2010 | Wang et al. | 370/332 |
| 2010/0273490 A1* | 10/2010 | Velde et al. | 455/436 |
| 2011/0028171 A1 | 2/2011 | Guo et al. | 455/502 |
| 2012/0040674 A1* | 2/2012 | McGilly et al. | 455/436 |
| 2012/0275329 A1* | 11/2012 | Chin et al. | 370/252 |

FOREIGN PATENT DOCUMENTS

| | | | |
|---|---|---|---|
| EP | 2341725 A1 * | 7/2011 | |
| EP | 2487957 A1 * | 8/2012 | |
| WO | WO2009022948 A1 | 2/2009 | |
| WO | WO2009082111 A2 | 7/2009 | |
| WO | WO 2011102769 A1 * | 8/2011 | |

OTHER PUBLICATIONS

3GPP TSG RAN WG4 Meeting #55 R4-101605, TD Tech, Interference Mitigation Method of 1.28Mcps TDD Home NodeB-Synchronization, Montreal, Canada dated May 10-14, 2010 (3 pages).

3GPP TS 36.300 V9.6.0 (Dec. 2010), 3rd Generation Partnership Project; Evolved Universal Terrestrial Radio Access (E-UTRA) and Evolved Universal Terrestrial Radio access Network (EUTRAN); Overall Description; Stage 2 (Release 9) paragraph [10.1.2.1] paragraph [15.3.3].

* cited by examiner

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

TDD UL-DL CONFIGURATIONS

FIG. 3

| PRACH CONFIG INDEX | PREAMBLE FORMAT | DENSITY PER 10ms | VERSION | PRACH CONFIG INDEX | PREAMBLE FORMAT | DENSITY PER 10ms | VERSION |
|---|---|---|---|---|---|---|---|
| 0 | 0 | 0.5 | 0 | 32 | 2 | 0.5 | 2 |
| 13 | 0 | 4 | 1 | 45 | 3 | 2 | 0 |
| 14 | 0 | 4 | 2 | 46 | 3 | 3 | 0 |
| 15 | 0 | 5 | 0 | 47 | 3 | 4 | 0 |
| 16 | 0 | 5 | 1 | 48 | 4 | 0.5 | 0 |
| 17 | 0 | 5 | 2 | 49 | 4 | 0.5 | 1 |
| 18 | 0 | 6 | 0 | 50 | 4 | 0.5 | 2 |
| 19 | 0 | 6 | 1 | 51 | 4 | 1 | 0 |
| 20 | 1 | 0.5 | 0 | 52 | 4 | 1 | 1 |
| 21 | 1 | 0.5 | 1 | 53 | 4 | 2 | 0 |
| 22 | 1 | 0.5 | 2 | 54 | 4 | 3 | 0 |
| 23 | 1 | 1 | 0 | 55 | 4 | 4 | 0 |
| 24 | 1 | 1 | 1 | 56 | 4 | 5 | 0 |
| 25 | 1 | 2 | 0 | 57 | 4 | 6 | 0 |
| 26 | 1 | 3 | 0 | 58 | N/A | N/A | N/A |

TDD PRACH CONFIGURATIONS

FIG. 4

(a) When (t' - ti) is less than 153600Ts (b) When (t' - ti) is greater than 153600Ts

OBTAINING SYSTEM FRAME NUMBER OF TARGET CELL DURING HANDOVER

CROSS REFERENCE TO RELATED APPLICATIONS

This application claims priority under 35 U.S.C. §119 from U.S. Provisional Application No. 61/431,452, entitled "Obtaining the System Frame Number of Target Cell during Handover," filed on Jan. 11, 2011, the subject matter of which is incorporated herein by reference.

TECHNICAL FIELD

The present invention relates generally to wireless communication systems and, more particularly, to low latency handover operations in wireless communication systems.

BACKGROUND

In wireless communication systems, such as defined by 3GPP Long Term Evolution (LTE/LTE-A) specification, user equipments (UE) and base stations (eNodeB) communicate with each other by sending and receiving data carried in radio signals according to a predefined radio frame format. Typically, the radio frame format contains a sequence of radio frames, each having the same frame length. The radio frames are numbered sequentially with a System Frame Number (SFN). Before a UE can access a serving base station, the UE needs to synchronize with the radio frame format used by the serving base station. Both physical (PHY) layer synchronization and Media Access Control (MAC) layer synchronization are performed.

For example, upon power-on, a UE first acquires downlink (DL) synchronization and adjusts its timing, frequency, and power via a synchronization channel (SCH) broadcasted by a serving base station. After DL synchronization, the UE acquires uplink (UL) PHY layer synchronization via ranging procedures and MAC layer synchronization via network entry procedures with the serving base station. During the synchronization process, the UE can detect radio frame edges/boundaries, and read SFN numbering information from radio signals transmitted from the base station, including other information such as frame format and frame structure.

The radio frame formats of different base stations, however, may not be synchronized with each other. In addition, although the frame lengths are typically the same, the frame structures of different base stations may be different, depending on the SFN. Therefore, in addition to determining frame format, the SFN may be required by the UE to communicate with the base station. For example, during a random access procedure, a radio resource allocated for a random access channel (RACH) to the UE may be related to the SFN.

The lack of synchronization between different base stations' frame formats poses problems for handover operation. A UE that is synchronized with its current serving cell cannot communicate with a target base station (e.g., a target cell) until the UE can synchronize with the frame format of the target cell. More specifically, the UE needs to know the SFN of the target base station when performing initial transmission on the RACH. This is because that the radio resource (e.g., the RACH opportunities) for RACH signal transmission may be related to the SFN of the target cell.

One mechanism to obtain the SFN is for the UE to read the physical broadcast channel (PBCH) or the broadcast channel (BCH) of the target cell. The UE can implicitly determine the SFN from decoding the PBCH/BCH. The PBCH/BCH is repeated every 10 ms, meaning that it takes an average of 5 ms and takes 10 ms at the worst case to receive and decode the PBCH/BCH. Such delay increases the handover interruption time. It is thus desirable that the UE can have other mechanisms to obtain the SFN of the target cell for handover operation before PBCH/BCH reading.

SUMMARY

A method of obtaining system frame number for handover is provided. A UE receives a handover command from a serving base station in a serving cell. The UE performs downlink synchronization with a target base station. Upon synchronization, the UE determines a radio frame boundary of a target cell. The UE then obtains a system frame number of the target cell based on the radio frame boundary. The UE performs a handover procedure with the target cell by transmitting a RACH preamble to the target base station. The RACH preamble is transmitted over a PRACH resource determined from the system frame number without reading SFN information from a PBCH/BCH broadcasted from the target base station. Finally, the UE establishes data connection with the target base station. Handover interruption time is reduced by obtaining SFN before PBCH reading and decoding.

In one advantageous aspect, it is proposed that when the PRACH physical resource of the handover target cell depends on the SFN of the target cell (e.g., in TDD mode, frame structure type 2, with PRACH configurations 51, 53, 54, 55, 56, 57 and uplink-downlink configurations 3, 4, 5), the absolute value of the relative time difference between radio frame i of the current cell and that of the target cell shall be less than half of the radio frame length. Based on such knowledge, an UE in the handover procedure may obtain the radio frame timing, i.e., SFN, of the target cell by means of performing synchronization procedure for that target cell. More specifically, a first radio frame in the target cell and a second radio frame in the serving cell have the same SFN when the two radio frames have a distance less than half of the radio frame length. Similarly, a first radio frame in the target cell and a second radio frame in the serving cell have consecutive SFN when the two radio frames have a distance more than half of the radio frame length.

Other embodiments and advantages are described in the detailed description below. This summary does not purport to define the invention. The invention is defined by the claims.

BRIEF DESCRIPTION OF THE DRAWINGS

FIG. 3 illustrates TDD mode uplink-downlink configurations in an LTE/LTE-A system.

FIG. 4 illustrates TDD mode random access configurations in an LTE/LTE-A system.

DETAILED DESCRIPTION

Reference will now be made in detail to some embodiments of the invention, examples of which are illustrated in the accompanying drawings.

Figure 1:
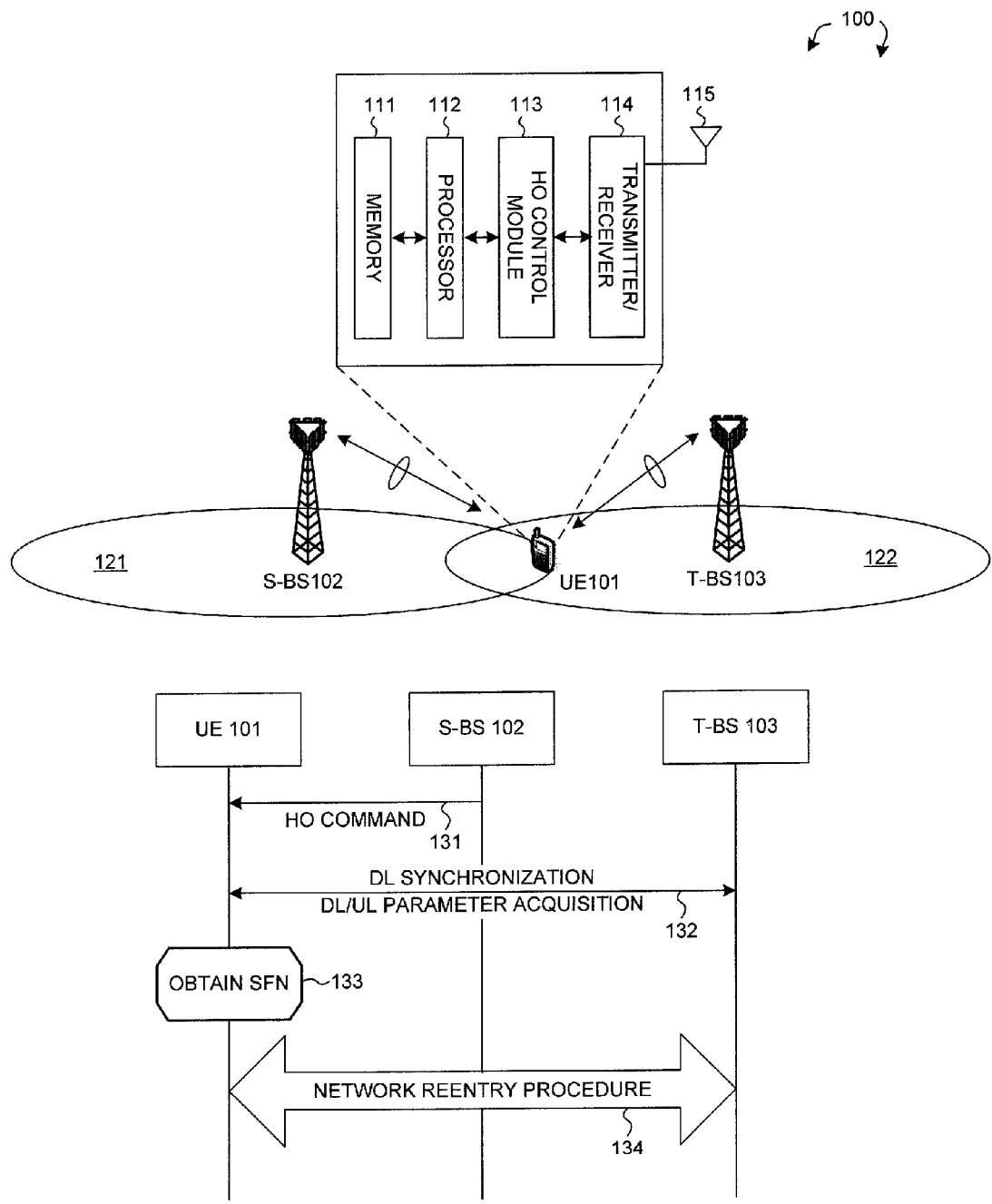
FIG. 1 illustrates a method of performing a handover procedure in a wireless communication system in accordance with one novel aspect.

FIG. 1 illustrates a method of performing a handover procedure in a wireless communication system 100 in accordance with one novel aspect. Wireless communication system 100 comprises a user equipment UE101, a serving base station S-BS102, and a target base station T-BS103. UE101 comprises memory 111, a processor 112, a handover (HO) control module 113, and a radio frequency (RF) transceiver module 114 (e.g., RF transmitter and receiver) coupled to an antenna 115. In one embodiment, wireless communication system 100 is a 3GPP LTE or LTE-Advances (LTE-A) network.

UE101 is originally served by S-BS102 in serving cell 121, and then performs handover operation with T-BS103 to be handover to target cell 122. As illustrated in FIG. 1, in step 131, UE101 receives a handover command from S-BS102, the handover command instructs UE101 to handover to T-BS103. In step 132, UE101 performs downlink synchronization with T-BS103. UE101 detects frame edges/boundaries of radio frames of the target cell, and acquires other downlink-uplink parameters. In step 133, UE101 obtains the system frame number (SFN) of the target cell (e.g., via the HO control module 113). In step 134, UE101 and T-BS103 performs network reentry procedure to complete the handover operation.

In one novel aspect, UE101 obtains the SFN of the target cell without reading and decoding information transmitted via the physical broadcast channel (PBCH) or the broadcast channel (BCH) broadcasted from the target base station. Instead, UE101 obtains the SFN of the target cell based on the frame boundary and timing information acquired from the downlink synchronization procedure. Based on the obtained SFN number, UE101 is then able to start performing network reentry procedure (e.g., a random access procedure over a physical random access channel (PRACH)) without additional time delay.

Figure 2:
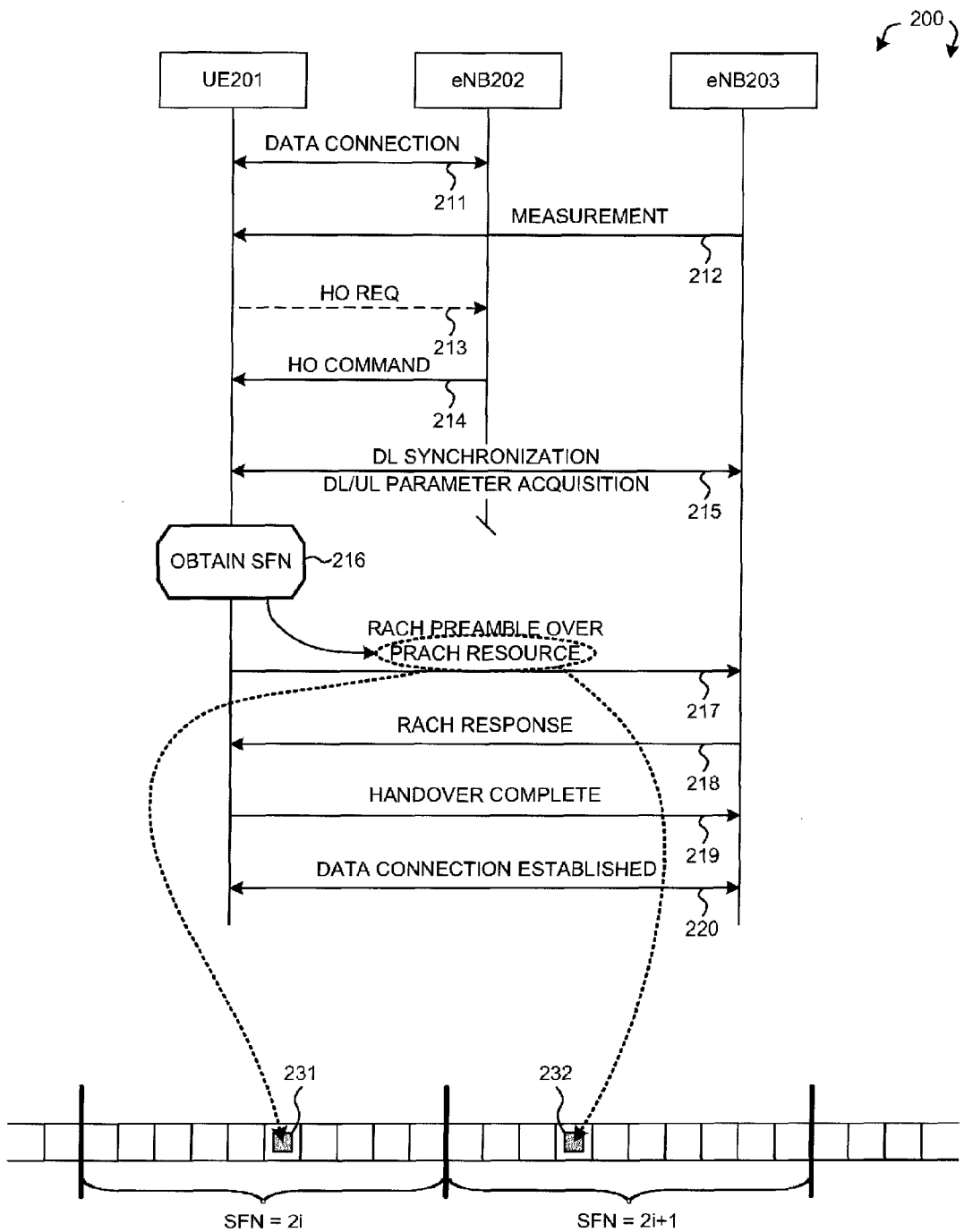
FIG. 2 illustrates one embodiment of a handover procedure in accordance with one novel aspect.

FIG. 2 illustrates one embodiment of a more detailed handover procedure in a wireless communication system 200 in accordance with one novel aspect. Wireless communication system 200 comprises UE201, serving eNB202, and target eNB203. In step 211, UE201 establishes data connection with its serving base station eNB202. In step 212, UE201 performs scanning and measurements for neighboring cells. In step 213, UE201 initiates a handover operation by transmitting a handover request to its serving eNB202 based on the measurement results. In step 214, eNB202 transmits a handover command to UE201 in response to the handover request. Alternatively, eNB202 may initiate the handover operation by transmitting a handover command to UE201 without receiving the handover request. In step 215, UE201 performs downlink (DL) synchronization with eNB203, during which UE201 detects frame edges/boundaries of radio frames of the target cell, and acquires other downlink-uplink parameters.

In step 216, UE201 obtains the system frame number (SFN) of the target cell based on the frame boundary and timing information acquired from the DL synchronization procedure. The obtained SFN number is then used by UE201 to immediately start performing a random access procedure over a PRACH. For example, UE201 uses the SFN number to determine an allocated PRACH resource. In step 217, UE201 transmits a RACH preamble over the allocated PRACH resource to the target base station eNB203. In step 218, UE201 receives a RACH response from eNb203. In step 219, UE201 transmits a handover complete message to eNB203. Finally, in step 220, UE201 establishes data connection with eNB203 for data communication.

In LTE/LTE-A networks, the PRACH resource (e.g., the PRACH opportunities or the physical radio resource blocks) used for RACH preamble transmission varies depending on difference frame structures and different PRACH preamble formats. In time division duplex (TDD) mode (i.e., frame structure type 2) with RACH preamble format 4, the frequency multiplexing is done according the following equation:

$$n_{PRB}^{RA} = \begin{cases} 6f_{RA}, & \text{if } ((n_f \bmod 2)*(2-N_{SP})+t_{RA}^{(1)})\bmod 2 = 0 \\ N_{RB}^{UL} - 6(f_{RA}+1), & \text{otherwise} \end{cases} \quad (1)$$

where $n_{PRB}^{RA}$: the first physical resource block allocated to the PRACH opportunity $f_{RA}$: frequency resource index in the quadruple ($f_{RA}$, $t_{RA}^{(0)}$, $t_{RA}^{(1)}$, $t_{RA}^{(2)}$)

$N_{RB}^{UL}$: number of uplink resource blocks $n_f$: system frame number (SFN)

$N_{SP}$: number of DL to UL switch points within the radio frame

From equation (1), it can be seen that, for RACH preamble format 4, the PRACH resource may depend on the system frame number (SFN) $n_f$ under certain configurations of frame structure type 2. For example, if the number of DL to UL switch points within the radio frame $N_{SP}$ is not equal to number two, then the first physical resource block allocated to the PRACH opportunity may be different depending whether the radio frame is an even-numbered frame or an odd-numbered frame (e.g., the SFN $n_f$ is even or odd). In the example of FIG. 2, if the current radio frame has an even system frame number (e.g., SFN=2i, i is an integer), then the PRACH slots may be allocated in one physical location as depicted by box 231. On the other hand, if the current radio frame has an odd system frame number (e.g., SFN=2i+1, i is an integer), then the PRACH slots may be allocated in another physical location as depicted by box 232. The number of DL to UL switch points within the radio frame $N_{SP}$, in turn, depends on uplink-downlink configurations.

FIG. 3 illustrates various uplink-downlink configurations in TDD mode in an LTE/LTE-A system. As defined in 3GPP specification, each radio frame is 10 ms long and has ten subframes, and each subframe is 1 ms long. In the example of FIG. 3, there are seven uplink-downlink configurations indexed from zero to six. Uplink-downlink configurations 0-2 and 6 all have two downlink-to-uplink switch points (e.g., $N_{SP}$=2). Take uplink-downlink configuration 1 as an example. The downlink-to-uplink switch point periodicity is 5 ms, indicating that there are two DL to UL switch points per 10 ms radio frame (e.g., $N_{SP}$=2). For example, there is one DL to UL switch point in subframe 1, and another DL to UL switch point in subframe 6. On the other hand, uplink-downlink configurations 3-5 all have 5 ms switch point periodicity and only one downlink-to-uplink switch point (e.g., $N_{SP}$=1). For example, there is only one DL to UL switch point in subframe 1. As a result, for uplink-downlink configurations 3-5, as depicted by box 302, the PRACH resource allocation depends on the system frame number $n_f$.

More specifically, time division duplex (TDD) mode (i.e., frame structure type 2) with RACH preamble format 4 implies PRACH configuration indices between 48 and 57.

FIG. 4 illustrates PRACH configurations in TDD mode in an LTE/LTE-A system. There are total sixty-four PRACH configurations indexed from 0-63 defined in 3GPP specification. Table 401 in FIG. 4 lists a part of those PRACH configurations (e.g., PRACH configuration indices 0, 13-26, 32, and 45-58). It can be seen that TDD mode RACH preamble format 4 implies PRACH configuration indices between 48 and 57, as depicted by box 402. According to 3GPP specification, PRACH configuration index 52 is not allowed for TDD UL-DL configurations 3-5.

In summary, in TDD mode with PRACH configurations 48-51 and 53-57 and uplink-downlink configurations 3-5, the PRACH resource allocation depends on the system frame number (SFN) $n_f$ of the target cell. One mechanism to obtain the SFN is for the UE to read the physical broadcast channel (PBCH) or the broadcast channel (BCH) of the target cell. The UE can implicitly determine the SFN from decoding the PBCH. The PBCH, however, is transmitted every 10 ms, which means that it takes an average of 5 ms and takes around 10 ms at worst case to receive and decode the PBCH. Such delay increases the handover interruption time, because RACH procedure cannot be performed properly until PBCH is decoded.

In the example of FIG. 4, it can be seen that PRACH configurations 48-50 having a PRACH density of 0.5 per 10 ms, which is equivalent to a period of 20 ms. Therefore, for PRACH configurations 48-50, a UE may be able to determine the SFN and PRACH resource allocation before PBCH reading based on 3GPP specification on certain system requirements. However, For the remaining PRACH configurations 51 and 53-57, the SFN cannot be determined until PBCH is read, Hence, RACH may not be performed correctly before PBCH decoding.

In one advantageous aspect, it is proposed that when the PRACH physical resource of the handover target cell depends on the SFN of the target cell (e.g., in TDD mode, frame structure type 2, with PRACH configurations 51, 53, 54, 55, 56, 57 and uplink-downlink configurations 3, 4, 5), the absolute value of the relative time difference between radio frame i of the current cell and that of the target cell shall be less than half of the radio frame length. Based on such knowledge, an UE in the handover procedure may obtain the radio frame timing, i.e., SFN, of the target cell by means of performing synchronization procedure for that target cell.

Figure 5:
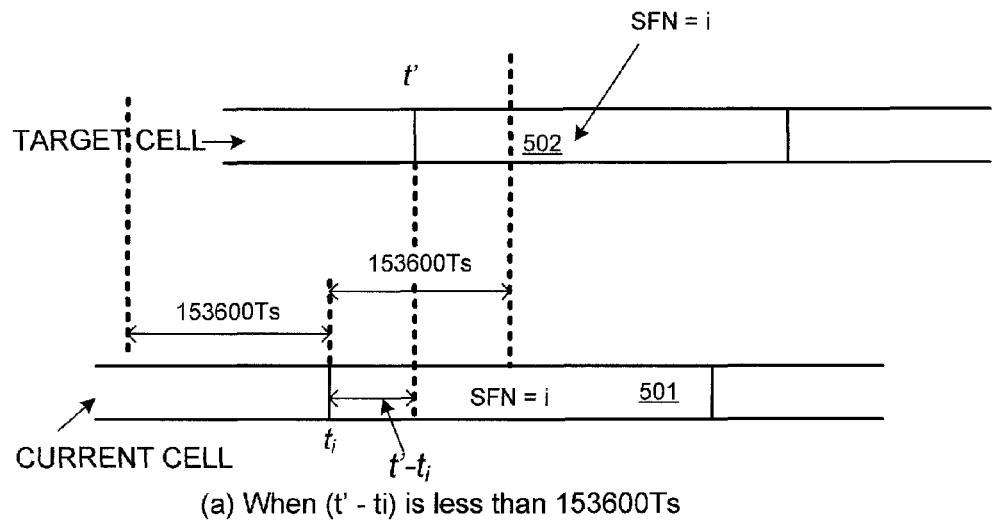
FIG. 5 illustrates a method of obtaining system frame number for handover procedure in an LTE/LTE-A system.
Figure 5:
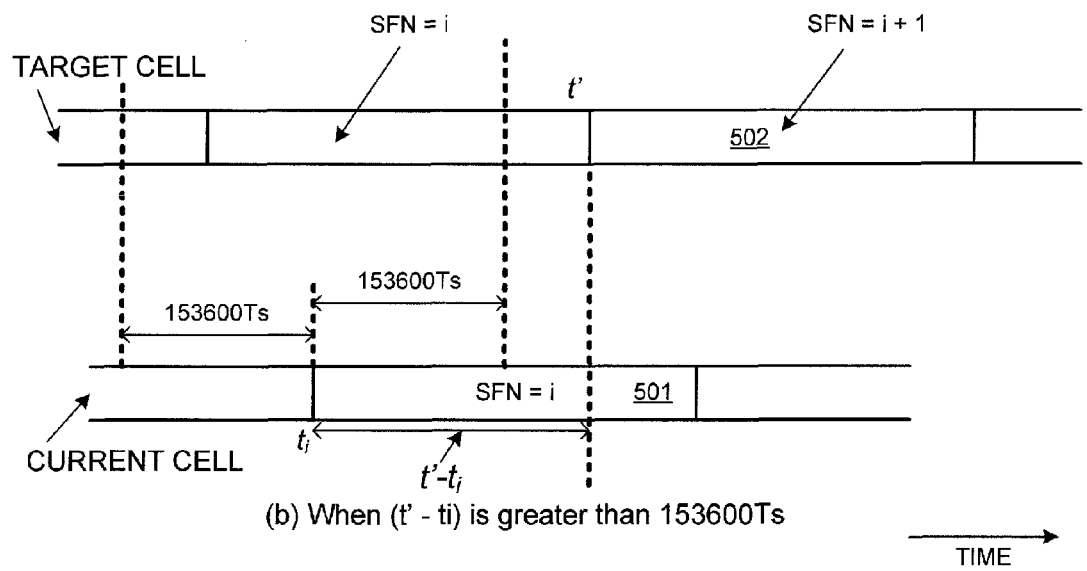

FIG. 5 illustrates a method of obtaining system frame number for handover in an LTE/LTE-A system. Before handover, a UE is served in a current serving cell and thus has the knowledge of frame boundaries and SFN information of the current cell. For example, the UE knows that i-th radio frame 501 (e.g., SFN=i) of the current cell starts at time instance $t_i$. After a handover procedure is initiated, the UE first performs downlink synchronization with the target cell. Upon downlink synchronization, the UE acquires frame boundary information of the target cell. For example, the UE knows that the first start-boundary of the target cell's radio frame occurring after $t_i$ (e.g., radio frame 502) is located at time instance t'. The UE also knows that the time difference between those two radio frame boundaries ($t'-t_i$) is less than one frame length (e.g., 307200 Ts).

The UE then attempts to determine the system frame number of radio frame 502 of the target cell. Because the absolute value of the relative time difference between radio frame of the current cell (e.g., the i-th frame) and that of the target cell (e.g., the same i-th frame) shall be less than half of the radio frame length, the UE can deduce the system frame number of frame 502 accordingly. As illustrated in the top part of FIG. 5, if the time difference ($t'-t_i$) is less than 153600 Ts (e.g., half of the radio frame length), then the SFN for radio frame 502 is also equal to i (e.g., frame 502 is the same i-th radio frame as frame 501). On the other hand, as illustrated in the bottom part of FIG. 5, if the time difference ($t'-t_i$) is greater than 153600 Ts (e.g., half of the radio frame length), then the SFN for radio frame 502 is equal to (i+1) (e.g., frame 502 is the (i+1)-th radio frame). Once the UE determines the SFN number of the target cell, the UE can also determine the PRACH physical resource allocation and start performing the RACH procedure immediately without waiting for PBCH reading.

Figure 6:
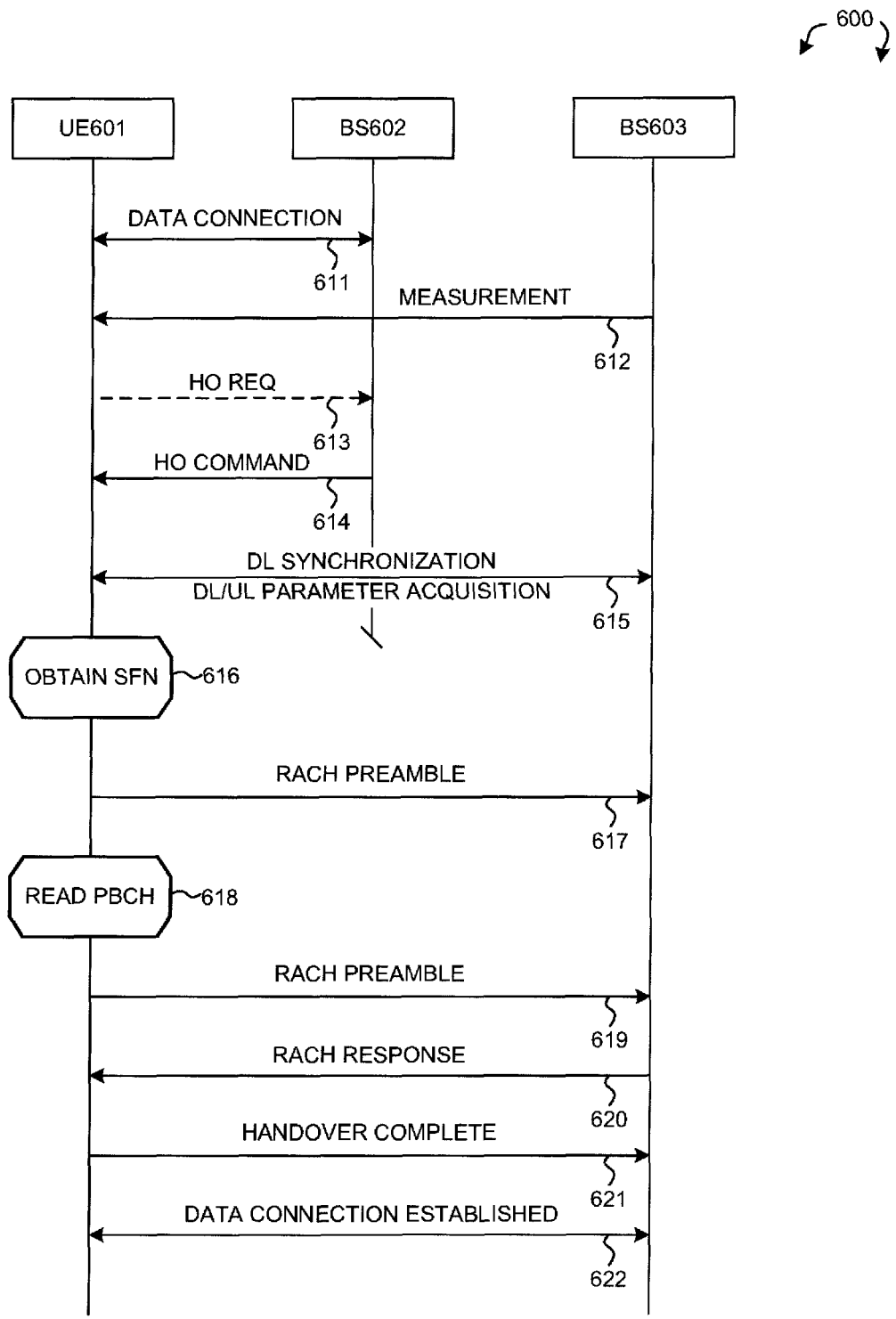
FIG. 6 illustrates another embodiment of a handover procedure in accordance with one novel aspect.

FIG. 6 illustrates another embodiment of a detailed handover procedure in a wireless communication network 600 in accordance with one novel aspect. Wireless communication system 600 comprises UE601, serving eNB602, and target eNB603. Similar to UE201 in FIG. 2, UE601 is originally served by serving eNB602, and later performs handover to target eNB603. Therefore, step 611 through step 617 is similar to step 211 through 217 of FIG. 2. In step 616, UE601 obtains the system frame number (SFN) of the target cell based on the frame boundary and timing information acquired from the DL synchronization procedure, as illustrated above in FIG. 5. The UE then uses the SFN number to determine the allocated PRACH resource. In step 617, UE601 starts a random access procedure by transmitting a RACH preamble over the allocated PRACH resource to the target base station eNB603.

The obtained system frame number of the target cell, however, may not be correct due to synchronization error or other errors (e.g., the actual timing between the serving cell and the target cell is large than half of the radio frame length). As a result, UE601 may not receive any RACH response from the target base station BS603. After reading and decoding PBCH in step 618, if UE601 still has not received the random access response grant from eNB603, UE601 then derives a new target cell SFN according to the information obtained from the PBCH. If the new target cell SFN is different from the one used by the previous RACH procedure, then UE601 gives up the on-going random access procedure and starts a new one. That is, UE601 obtains the physical location of the PRACH resource using the newly obtained SFN and then transmits a new RACH preamble to the target base station eNB603 in step 619. In step 620, UE601 receives a RACH response from eNB603. In step 621, UE601 transmits a handover complete message to eNB603. Finally, in step 622, UE601 establishes data connection with the target base station eNB603.

Figure 7:
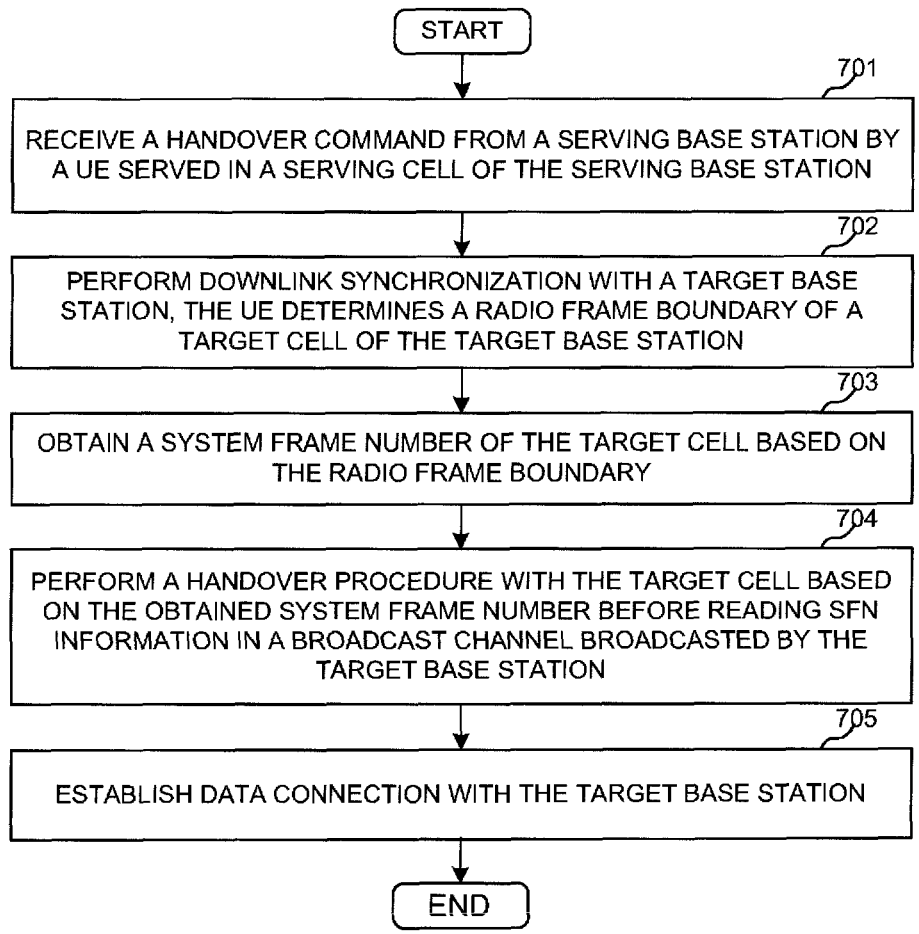
FIG. 7 is a flow chart of a method of obtaining system frame number for handover in accordance with one novel aspect.

FIG. 7 is a flow chart of a method of obtaining system frame number for handover in accordance with one novel aspect. In step 701, a UE receives a handover command from a serving base station in a serving cell. In step 702, the UE performs downlink synchronization with a target base station. The UE determines a radio frame boundary of a target cell upon synchronization. In step 703, the UE obtains a system frame number of the target cell based on the radio frame boundary. In step 704, the UE performs a handover procedure with the target cell by transmitting a RACH preamble to the target base station. The RACH preamble is transmitted over a PRACH resource determined from the system frame number without reading SFN information from a PBCH/BCH broadcasted from the target base station. In step 705, the UE establishes data connection with the target base station.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for handover in an LTE/LTE-A wireless communication system, the method comprising:
    receiving a handover command from a serving base station by a user equipment (UE), wherein the UE is served in a serving cell of the serving base station;
    performing downlink synchronization with a target base station, wherein the UE determines a first radio frame boundary of a target cell of the target base station;
    obtaining a system frame number (SFN) of the target cell by comparing the first radio frame boundary of the target cell and a second radio frame boundary of the serving cell and thereby deducing the SFN of the target cell from a time difference between the second radio frame boundary of the serving cell and the first radio frame boundary of the target cell before receiving additional SFN and timing information from the serving or the target base station; and
    performing a handover procedure with the target cell based on the deduced system frame number before reading SFN information in a broadcast channel broadcasted by the target base station.

2. The method of claim 1, wherein the handover procedure involves transmission over physical resource of a physical random access channel (PRACH) based on the obtained system frame number.

3. The method of claim 2, wherein the UE applies a time division multiplexing (TDD) frame structure, and wherein the PRACH has a Preamble Format 4.

4. The method of claim 3, wherein the PRACH has a list of configuration indices including 51, 53, 54, 55, 56, 57 in a range of uplink-downlink configurations from 3-5.

5. The method of claim 1, wherein the UE deduces the SFN of the target cell by assuming that an absolute value of a relative time difference between the second radio frame boundary of the serving cell and the first radio frame boundary of the target cell is less than half of a radio frame length.

6. The method of claim 5, wherein the first radio frame in the target cell and the second radio frame in the serving cell have the same SFN when the two radio frames have a distance less than half of the radio frame length.

7. The method of claim 5, wherein the first radio frame in the target cell and the second radio frame in the serving cell have consecutive SFN when the two radio frames have a distance more than half of the radio frame length.

8. A user equipment (UE) in an LTE/LTE-A wireless communication system, the UE comprises:
    a radio frequency (RF) module comprising an RF receiver that receives a handover command from a serving base station, wherein the UE is served in a serving cell of the serving base station, and wherein the UE performs downlink synchronization with a target cell of a target base station; and
    a control module that determines a first radio frame boundary of the target cell and obtains a system frame number (SFN) of the target cell by comparing the first radio frame boundary of the target cell and a second radio frame boundary of the serving cell and thereby deducing the SFN of the target cell from a time difference between the second radio frame boundary of the serving cell and the first radio frame boundary of the target cell before receiving additional SFN and timing information from the serving or the target base station, wherein the UE performs a handover procedure with the target cell based on the deduced system frame number before reading SFN information in a broadcast channel broadcasted by the target base station.

9. The UE of claim 8, wherein the handover procedure involves transmission over physical resource of a physical random access channel (PRACH) based on the obtained system frame number.

10. The UE of claim 8, wherein the UE applies a time division multiplexing (TDD) frame structure, and wherein the PRACH has a Preamble Format 4.

11. The UE of claim 10, wherein the PRACH has a list of configuration indices including 51, 53, 54, 55, 56, 57 in a range of uplink-downlink configurations from 3-5.

12. The UE of claim 8, wherein the UE deduces the SFN of the target cell by assuming that an absolute value of a relative time difference between the second radio frame boundary of the serving cell and the first radio frame boundary of the target cell is less than half of a radio frame length.

13. The UE of claim 12, wherein the first radio frame in the target cell and the second radio frame in the serving cell have the same SFN when the two radio frames have a distance less than half of the radio frame length.

14. The UE of claim 12, wherein the first radio frame in the target cell and the second radio frame in the serving cell have consecutive SFNs when the two radio frames have a distance more than half of the radio frame length.

15. A method, comprising:
    performing downlink synchronization with a target base station, wherein the UE is served by a serving cell of a serving base station, and wherein the UE determines a first radio frame boundary of a target cell of the target base station;
    obtaining a first system frame number (SFN) of the target cell by comparing the first radio frame boundary of the target cell and a second radio frame boundary of the serving cell before reading SFN information in a broadcast channel broadcasted by the target base station, wherein the UE deduces the first SFN of the target cell from a time difference between the second radio frame boundary of the serving cell and the first radio frame boundary of the target cell before receiving additional SFN and timing information from the serving or the target base station; and
    performing a random access procedure with the target cell over a physical random access channel (PRACH) based on the deduced first system frame number, wherein the UE applies a time division multiplexing (TDD) frame structure, and wherein the PRACH has a Preamble Format 4.

16. The method of claim 15, wherein the PRACH has a list of configuration indices including 51, 53, 54, 55, 56, 57 in a range of uplink-downlink configurations from 3-5.

17. The method of claim 15, wherein the UE deduces the first SFN of the target cell by assuming that an absolute value of a relative time difference between the second radio frame boundary of the serving cell and the first radio frame boundary of the target cell is less than half of a radio frame length.

18. The method of claim 15, further comprising:
    reading the SFN information from the broadcast channel of the target base station and deriving a second SFN of the target cell, wherein the second SFN is different from the first SFN; and
    performing another random access procedure based on the second SFN of the target cell.

* * * * *